United States Patent
Rink et al.

(10) Patent No.: US 6,399,718 B1
(45) Date of Patent: Jun. 4, 2002

(54) POLYURETHANE RESIN, METHOD FOR THE PRODUCTION AND USE THEREOF IN AN AQUEOUS DUAL COMPONENT CLEAR VARNISH

(75) Inventors: Heinz-Peter Rink; Horst Hintze-Brüning; Peter Weinert, all of Münster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/446,695

(22) PCT Filed: Jul. 1, 1998

(86) PCT No.: PCT/EP98/04069

§ 371 (c)(1),
(2), (4) Date: Feb. 21, 2000

(87) PCT Pub. No.: WO99/01491

PCT Pub. Date: Jan. 14, 1999

(30) Foreign Application Priority Data

Jul. 3, 1997 (DE) .......................................... 197 28 411

(51) Int. Cl.[7] ........................ C08G 18/08; C08G 18/71; C08G 18/10; C08L 75/04
(52) U.S. Cl. ........................ 525/452; 525/127; 525/920; 526/932; 528/65
(58) Field of Search ................................ 525/452, 127, 525/920; 528/65; 526/932

(56) References Cited

U.S. PATENT DOCUMENTS

| 3,850,770 | A | * | 11/1974 | Juna et al. ............... 525/127 X |
| 3,923,713 | A | | 12/1975 | Hermann |
| 4,080,318 | A | | 3/1978 | Smith et al. |
| 4,177,342 | A | * | 12/1979 | Bock et al. ............... 528/65 X |
| 4,252,923 | A | * | 2/1981 | König et al. ................. 525/452 |
| 4,552,932 | A | * | 11/1985 | Schollenberger ........ 525/920 X |
| 4,609,706 | A | * | 9/1986 | Bode et al. .............. 525/127 X |
| 4,813,875 | A | * | 3/1989 | Hare ....................... 525/920 X |
| 5,166,300 | A | * | 11/1992 | Rumon et al. ................. 528/65 |
| 5,321,101 | A | * | 6/1994 | Suzuki et al. ................. 525/452 |
| 5,500,475 | A | * | 3/1996 | Eicken et al. ............. 528/65 X |
| 5,510,444 | A | * | 4/1996 | Halpaap et al. ........ 525/452 X |
| 5,684,083 | A | * | 11/1997 | Temple et al. .......... 525/127 X |

FOREIGN PATENT DOCUMENTS

| DE | 31 50 174 C2 | 12/1981 | ............ C08G/18/66 |
| DE | 37 06 095 A1 | 2/1987 | ............ C08G/77/20 |
| DE | 38 07 571 A1 | 3/1988 | ............ C08L/83/07 |
| DE | 40 10 176 A1 | 3/1990 | ............ B05D/7/24 |
| DE | 40 24 204 A1 | 7/1990 | ......... C09D/175/04 |
| DE | 41 22 265 A1 | 7/1991 | ............ C05L/75/14 |
| DE | 42 26 270 A1 | 8/1992 | ......... C09D/175/04 |
| DE | 42 36 901 A1 | 10/1992 | ............ C08G/18/40 |
| DE | 196 06 783 A1 | 2/1996 | ............ C08G/18/42 |
| EP | 0 308 115 B1 | 9/1988 | ......... C08F/283/00 |
| EP | 0 510 572 A2 | 4/1992 | ......... C08F/283/00 |
| EP | 0 358 153 B1 | 1/1994 | ......... C09D/143/04 |

* cited by examiner

Primary Examiner—Richard D. Lovering

(57) ABSTRACT

The present invention provides a polyurethane resin obtainable by (A) in a first reaction stage (A) reacting
   (a) one or more di- and/or polyisocyanates,
   (b) one or more compounds (b) which have at least one group which ensures dispersibility in water and more than one group which is reactive toward isocyanate groups, and
   (c) if desired, one or more compounds having at least 2 and not more than 3 OH groups to give an intermediate (A) having free isocyanate groups and having urethane groups, (B) in a second reaction stage (B) adding
   (d) one or more monoisocyanates to the intermediate (A) obtained in stage (A), and (C) subsequently reacting the resulting mixture (B) with one or more hydroxyl-containing polymers (D) to give the polyurethane resin (P), using less than 20% by weight, based on the weight of the polyurethane resin (solids content), of polyalkylene oxide diols and/or polyalkylene oxide polyols to prepare the polyurethane resin.

26 Claims, No Drawings

POLYURETHANE RESIN, METHOD FOR THE PRODUCTION AND USE THEREOF IN AN AQUEOUS DUAL COMPONENT CLEAR VARNISH

This application is a 371 of PCT/EP98/04069 filed Jul. 1, 1998.

The present invention relates to a polyurethane resin suitable as a rheological control additive for aqueous coating compositions.

The present specification further relates to processes for preparing this polyurethane resin and to aqueous two-component polyurethane coating compositions comprising this polyurethane resin, to the use of these coating compositions and to the use of the polyurethane resin as an additive for controlling the rheology of coating compositions.

In the field of coating plastics there is a keener desire for aqueous systems, both as primers and as topcoats. In these applications the coating materials used have to meet a large number of different requirements. In particular, for instance, in the field of coating plastics there is the requirement that the resulting coatings exhibit a good "appearance", i.e., for example, high gloss and low haze levels. Furthermore, for example, in the wet-on-wet process for producing a basecoat/clearcoat system, clearcoats applied to the as yet uncured basecoat should not cause incipient dissolution of or otherwise disrupt the basecoat film, since otherwise finishes of poor appearance are obtained. This applies in particular to finishes produced using basecoats that contain effect pigments (e.g., metal pigments, especially aluminum flakes or pearl luster pigments).

In addition, the coating compositions ought to exhibit very little tendency toward running (curtaining, development of tears, sagging) on vertical faces, on edges and in beads, following application, especially during the baking operation or during the drying operation at temperatures generally from room temperature to about 80° C. It is known that this tendency to run can be influenced by controlling the rheology of the coating compositions. By increasing the viscosity of the known coating materials, however, the improvement which can be obtained in the tendency to run is inadequate.

It is in fact known that polyurea compounds act to stabilize running. A serious disadvantage of known polyureas, however, is haze in the baked coating film, especially when the polyureas are used in clearcoats. In order to overcome this problem, DE-A-42 36 901 proposed the use of acrylated polyurethane resins prepared by reacting a hydroxyl-containing acrylate copolymer, a hydroxy-functional microdispersion, a diisocyanate and a monoamine as an additive to control the rheology of conventional coating compositions. The polyurethane resins described in DE-A-42 36 901, however, have the disadvantage that their preparation requires a complex process comprising a plurality of synthesis steps and that they are unsuitable for aqueous coating materials.

Furthermore, DE-C-31 50 174 also discloses hydrophobic polyurethane resins containing urea groups, said resins being based on a polyalkylene oxide diol having a molecular weight of from 2000 to 20,000 and their use as thickeners for controlling the rheology of aqueous coating compositions. Because of the high level of ether groups, however, the polyurethane resins described in DE-C-31 50 174 have the disadvantage that the films become sensitive to condensation. In addition, the thickeners described therein become manageable only at high levels of dilution. Furthermore, these thickeners cannot be used as film formers. Since the polyether segments of the thickener enter into stable interactions with water, there may be instances of instability on storage above 40° C.

Moreover, German Patent Application P 196 11 646.5, unpublished at the priority date of the present specification, discloses an aqueous two-component polyurethane coating composition suitable for coating plastics. The use of monoisocyanate-modified polyurethane resins as rheology control additives, however, is not described.

Furthermore, German Patent Application P 196 06 783.9, unpublished at the priority date of the present specification, discloses polyurethane resins and their use as an additive for aqueous coating materials for the purpose of increasing the rheology stability. Monoisocyanate-modified polyurethane resins are not, however, described in that document.

The object of the present invention is therefore to provide polyurethane resins suitable as an additive, especially in aqueous coating compositions, where they can be used to control the viscosity. As far as possible, these polyurethane resins should also function as a binder component in such compositions. In particular, these polyurethane resins, especially when used in aqueous two-component polyurethane coating compositions and with particular preference when used in clearcoats, should lead to coatings having a good appearance (e.g., high gloss, low haze). At the same time, the resulting coating compositions should exhibit minimal tendency to run following application. Furthermore, the coating compositions prepared using these polyurethane resins should exhibit good basecoat wetting when used as a clearcoat for producing a multicoat paint system. In the case of two-component coating compositions, moreover, the binder component (I) of the coating composition should possess very long storage stability.

Finally, in the field of plastics coating, there is a further requirement that the coating compositions employed are curable at low temperatures (generally<100° C.) and even when cured at these low temperatures lead to films having the desired properties.

This object is surprisingly achieved by a polyurethane resin (P) obtainable by (A) in a first reaction stage (A) reacting
  (a) one or more di- and/or polyisocyanates,
  (b) one or more compounds (b) which have at least one group which ensures dispersibility in water and more than one group which is reactive toward isocyanate groups, and
  (c) if desired, one or more compounds having at least 2 and not more than 3 OH groups
to give an intermediate (A) having free isocyanate groups and having urethane groups, (B) in a second reaction stage (B) adding
  (d) one or more monoisocyanates
to the intermediate (A) obtained in stage (A), and (C) subsequently reacting the resulting mixture (B) with one or more hydroxyl-containing polymers and/or oligomers (D) to give the polyurethane resin (P), using less than 20% by weight, based on the weight of the polyurethane resin (solids content), of polyalkylene oxide diols and/or polyalkylene oxide polyols to prepare the polyurethane resin.

The invention additionally provides processes for preparing these polyurethane resins and coating compositions, especially aqueous two-component polyurethane compositions, which comprise said polyurethane resin, and provides for the use of these coating compositions and for the use of the polyurethane resin as a rheology control additive.

It is surprising and was not foreseeable that the polyurethane resins both act as a binder component and possess rheology control properties and promote the formation of transparent coating films of high homogeneity. A further advantage is that the polyurethane resins, especially used in aqueous two-component polyurethane coating compositions, preferably when used in clearcoats, lead to coatings having a good appearance (e.g., high gloss, low haze) combined with minimal tendency to run. Furthermore, the coating compositions prepared using these polyurethane resins exhibit good basecoat wetting when used as a clearcoat to produce a multicoat paint system. Furthermore, the binder component (I) of the coating composition—in the case of two-component coating compositions—has a long storage stability. It is also advantageous, finally, that the coating compositions employed can be cured at low temperatures (generally<100° C.) and even when cured at these low temperatures lead to films having the desired properties.

The preparation of the polyurethane resin (P) of the invention involves (A) in a first reaction stage (A) reacting
  (a) one or more di- and/or polyisocyanates,
  (b) one or more compounds (b) which have at least one group which ensures dispersibility in water and more than one group which is reactive toward isocyanate groups, and
  (c) if desired, one or more compounds having at least 2 and not more than 3 OH groups to give an intermediate (A) having free isocyanate groups and having urethane groups.

As suitable multifunctional isocyanates (a) for preparing the polyurethane resins (P) mention may be made of aliphatic, cycloaliphatic and/or aromatic polyisocyanates having at least two isocyanate groups per molecule, preference being given to the use of isocyanates whose urethanes are able to form allophanates. The isomers or isomer mixtures of organic diisocyanates are preferred. On the basis of their good stability to ultraviolet light, (cyclo)aliphatic diisocyanates give rise to products having a low tendency toward yellowing. The polyisocyanate component used to form the polyurethane resin may also include a fraction of polyisocyanates of higher functionality, providing this does not cause any gelling. Products which have been found suitable as triisocyanates are those formed by trimerization or oligomerization of diisocyanates or by reaction of diisocyanates with polyfunctional compounds containing OH or NH groups. The average functionality can be reduced if desired by adding monoisocyanates.

Examples of polyisocyanates which can be used are phenylene diisocyanate, tolylene diisocyanate, xylylene diisocyanate, bisphenylene diisocyanate, naphthylene diisocyanate, diphenylmethane diisocyanate, isophorone diisocyanate, isocyanatopropylcyclohexyl isocyanate, cyclobutane diisocyanate, cyclopentylene diisocyanate, cyclohexylene diisocyanate, methylcyclohexylene diisocyanate, dicyclohexylmethane diisocyanate, ethylene diisocyanate, trimethylene diisocyanate, tetramethylene diisocyanate, pentamethylene diisocyanate, hexamethylene diisocyanate, propylene diisocyanate, ethylethylene diisocyanate and trimethylhexane diisocyanate, and derivatives thereof.

Preference is given to the use of hexamethylene diisocyanate, isophorone diisocyanate, isocyanatopropylcyclohexyl isocyanate, and 4,4'-dicyclohexylmethanediyl diisocyanate.

Generally speaking, polyurethanes are not compatible with water unless specific constituents are incorporated and/or particular preparation steps are taken during their synthesis. Thus, to prepare the polyurethane resins (P) of the invention, compounds (b) are used which contain more than one isocyanate-reactive group and at least one group which ensures dispersibility in water. Suitable groups of this kind are nonionic groups (e.g., polyethers), groups capable of forming anions, mixtures of these two groups, or groups capable of forming cations; preferably groups capable of forming anions.

In this context, however, it is also important not to incorporate too great a number of ether groups into the polyurethane resin. The polyurethane resin is therefore prepared using less than 20% by weight, based on the weight of the polyurethane resin (solids content), of polyalkylene oxide diols and/or polyalkylene oxide polyols. Preference is given, moreover, to the use of polyalkylene oxide diols and polyols having a number-average molecular weight of less than 2000. With particular preference, essentially no polyalkylene oxide diols and polyalkylene oxide polyols are used to prepare the polyurethane resins (P).

It is therefore possible in a preferred manner to incorporate into the polyurethane resin an acid number so great that the neutralized product can be dispersed stably in water. This is done using compounds which contain more than one isocyanate-reactive group and at least one group capable of forming anions. Particularly suitable isocyanate-reactive groups are hydroxyl groups and also primary and/or secondary amino groups. Groups capable of forming anions are, in particular, carboxyl, sulfonic acid and/or phosphonic acid groups. Preference is given to the use of alkanoic acids having two substituents on the alpha carbon atom. The substituent can be a hydroxyl group, an alkyl group or an alkylol group. These polyols have at least one and generally from 1 to 3 carboxyl groups in the molecule. They have 2 to about 25, preferably 3 to 10 carbon atoms. It is preferred to use di- and/or polyhydroxyalkanoic acids and very particularly preferred to use dimethylolpropanoic acid and dimethylolbutanoic acid. The compound (b) can make up from 1 to 25% by weight, preferably from 1 to 20% by weight, of the total polyol constituent (i.e., including component (D)) in the polyurethane resin (P).

The amount of ionizable carboxyl groups available in salt form as a result of neutralization of the carboxyl groups is generally at least 0.4% by weight, preferably at least 0.7% by weight, based on solids. The upper limit is about 12% by weight. The amount of dihydroxyalkanoic acids in the non-neutralized pre-polymer gives an acid number of at least 5 mg KOH/g, preferably at least 10 mg KOH/g. At very low acid numbers, further measures are generally necessary in order to achieve dispersibility in water. The upper limit on the acid number is 150 mg KOH/g, preferably 40 mg KOH/g, based on solids. The acid number is preferably situated within the range from 20 to 40 mg KOH/g.

All compounds which are commonly used and have at least two and not more than 3 OH groups are suitable as the alcohol component (c). Preference is given to the use, as component (c), of low molecular mass compounds, although it is also conceivable to use oligomeric and/or polymeric compounds, alone or in combination with low molecular mass compounds. Preference is therefore given as component (c) to the use of compounds having a number-average molecular weight of from 60 to 600, preferably of up to 400, and/or having a hydroxyl number of from 10 to 1800, preferably from 50 to 1200 mg KOH/g.

As examples of suitable compounds (c) mention may be made of trimethylolethane, trimethylolpropane, glycerol, trishydroxyethyl isocyanurate, 1,2,4-butanetriol, propaneand hexanetriols. The polyols (c) can be used alone or as a mixture. Preference is given to the use of trimethylolpropane.

The intermediates (A) containing isocyanate and urethane groups can be prepared by reacting the polyols (c) and compounds (b) with excess polyisocyanates (a) at temperatures of up to 150 degrees C, preferably from 50 to 130 degrees C., in organic solvents which cannot react with isocyanates. As solvents in this first stage of the process it is possible, therefore, to use, for example, ketones, ethers, or ethers having terminal ester groups, such as, for example, ethyl ethoxypropionate, or N-methylpyrrolidone and the like.

For the preparation of the intermediates (A) the ratio of equivalents of NCO groups of the compound (a) to the OH groups of the compounds (b) and (c) is usually between 4.0:1.0 and >1.0:1.0, preferably between 3.0:1 and 1.8:1.

In a second reaction stage (B), the intermediate (A) obtained in the first stage and containing isocyanate and urethane groups is mixed with one or more monoisocyanates (d) to form the mixture (B).

All commonly used monoisocyanates are suitable as the monoisocyanate (d), although it is preferred to use monoisocyanates which are not highly volatile at room temperature, i.e., which have a boiling point of preferably more than 50° C.

As examples of suitable monoisocyanates mention may be made of cycloaliphatic monoisocyanates, such as, for example, cyclohexyl isocyanate and cyclopentyl isocyanate, and aliphatic monoisocyanates, such as, for example, dodecyl isocyanate, isodecyl isocyanate, lauryl isocyanate, and stearyl isocyanate. Stearyl isocyanate is used with preference.

The reaction with the monoisocyanate takes place usually at temperatures of up to 150 degrees C, preferably from 50 to 130 degrees C, in organic solvents which cannot react with isocyanates. Catalysts, such as dibutyltin dilaurate, zinc stearate, tin oxide, etc., can also be used for this reaction. Examples of solvents which can be used in this first process stage are again ketones, ethers, or ethers having terminal ester groups, such as, for example, ethyl ethoxypropionate, or N-methylpyrrolidone and the like.

In order to prepare the mixture (B), the ratio of equivalents of NCO groups of the monoisocyanates (d) to the urethane groups of the intermediate (A) is preferably between 1:1 and 0.5:1.

In a further reaction stage (C), the mixture (B) is subsequently reacted with one or more hydroxyl-containing oligomers and/or polymers (D) to form the polyurethane resin (P). In this context it is preferred to use hydroxyl-containing polymers (D) having an OH number of from 100 to 1800 mg KOH/g, with particular preference from 120 to 1200 mg KOH/g, with very particular preference from 180 to 800 mg KOH/g, and/or having a number-average molecular weight of from 500 to 3000, with particular preference from 750 to <2000, and/or having a degree of branching of from 2 to 4. As the polymer and/or oligomer (D) it is possible in particular to use hydroxyl-containing polyesters, alkyd resins, polyethers, polyacrylate resins, polyurea resins, polyurethane resins, and/or polycarbonate resins.

In order to obtain a polyurethane resin of high flexibility, use should be made as polymer (D) of a high proportion of a predominantly linear polyol having a preferred OH number of from 30 to 150 mg KOH/g. Up to 97% by weight of the total polyol used to prepare the polyurethane (P) (that is, components (b), (c) and (D)) can consist of saturated and unsaturated polyesters and/or polyethers having a number-average molecular weight Mn of from 400 to 5000 daltons. The polyether diols selected should not introduce excessive amounts of ether groups, since otherwise the polymers formed swell in water. Polyester diols are prepared by esterifying organic dicarboxylic acids or their anhydrides with organic diols or are derived from a hydroxy carboxylic acid or a lactone. In order to prepare branched polyester polyols, it is possible to a minor extent to use polyols or polycarboxylic acids having a higher functionality.

The proportions of components (a) to (d) and (D) can be chosen within wide ranges and as a function of the reaction components. However, said proportions are chosen such that the polyurethane resin (P) has the desired characteristic numbers. In the context of these numbers, preferably, the polyurethane resin (P) has an acid number of from 20 to 40 mg KOH/g, preferably from 25 to 35 mg KOH/g, and/or an OH number of from 60 to 300 mg KOH/g, preferably from 80 to 200 mg KOH/g, and/or a number-average molecular weight of from 1000 to 10,000, preferably from 1500 to 5000. If the polyurethane resin contains hydrophilic groups (e.g., ether groups), the polyurethane resin can also have an acid number of less than 20 mg KOH/g down to 1 mg KOH/g.

As component (D) in stage (C) for preparing the polyurethane resins (P) of the invention, very particular preference is given to the use of a polycondensation product formed from (k1) from 10 to 45 mol % of at least one diol,
(k2) from 5 to 50 mol % of at least one polyol having at least 3 OH groups per molecule,
(k3) from 35 to 47 mol % of at least one di- and/or polycarboxylic acid, alone or together with a monocarboxylic acid, and
(k4) from 0 to 20 mol % of at least one monool, the sum of the molar % of components (k1) to (k4) being in each case 100 mol % and the condensation product being obtainable preferably by subjecting components (k1) to (k4) to a condensation reaction until the reaction product (D) has an acid number of from 1 to 10 mg KOH/g.

Polymers (D) used with particular preference are obtained if components (k1), (k2), (k3) and (k4) are used in molar ratios such that the sum of the OH building blocks (k1), (k2) and (k4) overall and the sum of the COOH building blocks (k3) are in a ratio of from 0.8:1 to 1.6:1.

As examples of polycarboxylic acids which can be used as component (k3) mention may be made of aromatic, aliphatic and cycloaliphatic polycarboxylic acids. It is preferred as component (k3) to use aromatic and/or aliphatic polycarboxylic acids.

Examples of suitable polycarboxylic acids are phthalic acid, isophthalic acid, terephthalic acid, halophthalic acids, such as tetrachloro- and tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid, cyclobutanetetracarboxylic acid, et cetera. The cycloaliphatic polycarboxylic acids can be used either in their cis form or in their trans form and as a mixture of both forms. Also suitable are the esterifiable derivatives or the abovementioned polycarboxylic acids, such as, for example, their mono- or polyesters with aliphatic alcohols having 1 to 4 carbon atoms or hydroxy alcohols having 1 to 4 carbon atoms. It is also possible, furthermore, to use the anhydrides of the abovementioned acids, where they exist.

Examples of suitable diols (k1) for preparing the polyester (D) are ethylene glycol, propanediols, butanediols, hexanediols, neopentyl glycol hydroxypivalate, neopentyl glycol, diethylene glycol, cyclohexanediol, cyclohexanedimethanol, trimethylpentanediol, and ethylbutylpropanediol. Also suitable, furthermore, are aliphatic polyether diols, such as linear or branched poly (oxyethylene) glycols, poly(oxypropylene) glycols and/or poly(oxybutylene) glycols, and mixed polyether diols, such as poly(oxyethyleneoxypropylene) glycols. The polyether diols usually have a molar mass Mn of from 400 to 3000.

The diols used may also include, furthermore, aromatic or alkylaromatic diols, such as, for example, 2-alkyl-2-phenyl-1,3-propanediol, bisphenol derivatives with ether functionality, etc.

Suitable further diols also include esters of hydroxy carboxylic acids with diols, in which case the diol used can be any of the abovementioned dials. Examples of hydroxy carboxylic acids are hydroxypivalic acid or dimethylolpropanoic acid or dimethylolbutanoic acid.

The dials can be used alone or as a mixture of different diols.

Examples of polyols suitable as component (k2) are ditrimethylolpropane, trimethylolethane, trimethylolpropane, glycerol, pentaerythritol, homopentaerythritol, dipentaerythritol, trishydroxyethyl isocyanate, 1,2,4-butanetriol, propane- and hexanetrials, and trihydroxy carboxylic acids, such as trihydroxymethyl (ethyl)ethanoic acids. The polyols having at least 3 OH groups can be used alone or as a mixture. If desired, the trials can be used together with monohydric alcohols (k4), such as, for example, butanol, octanol, lauryl alcohol, cyclohexanol, tert-butylcyclohexanol, ethoxylated and/or propoxylated phenols.

The polyesters (D) are prepared by the known methods of esterification, as described, for example, in DE-A-40 24 204, page 4, lines 50 to 65.

This reaction takes place usually at temperatures between 180 and 280 degrees C, in the presence or absence of a suitable esterification catalyst, such as, for example, lithium octoate, dibutyltin oxide, dibutyltin dilaurate, para-toluenesulfonic acid and the like.

The preparation of the polyesters (D) is usually conducted in the presence of small amounts of a suitable solvent as entrainer. Examples of entrainers used are aromatic hydrocarbons, such as especially xylene and (cyclo)aliphatic hydrocarbons, e.g., cyclohexane. In addition, however, it is also possible to prepare the polyesters without solvent (reaction in bulk).

The condensation reaction is preferably conducted up to a degree of conversion such that the reaction mixture has an acid number of from about 1 to 10, preferably from 1 to 5.

Prior to its further reaction with the mixture (B), the resulting polyester (D) is diluted to a solids content of from 50 to 90% with a solvent which advantageously does not engage in the reaction. Suitable solvents include glycol ethers such as ethylene glycol dimethyl ether, glycol ether esters, such as ethylglycol acetate, butylglycol acetate, 3-methoxy-n-butyl acetate, butyldiglycol acetate, methoxypropyl acetate, esters such as butyl acetate, isobutyl acetate, amyl acetate, ketones such as methyl ethyl ketone, methyl isobutyl ketone, diisobutyl ketone, cyclohexanone, and isophorone. It is also possible, furthermore, to use aromatic hydrocarbons, such as xylene, and aliphatic hydrocarbons.

In reaction step (C) the polyester (D) and, if appropriate, the other polymers (D) is or are then reacted in a manner known per se with the mixture (B) containing isocyanate groups; i.e., (D) is urethanized. The urethanization reaction is preferably conducted to a high degree of conversion; the isocyanate content of the reaction product obtained is preferably below 0.5, in particular below 0.1%.

The polyurethane (P) obtained in this way can be used in the form of the organic solution or else as an aqueous dispersion. To prepare the aqueous dispersion, the reaction mixture is neutralized with a base following reaction (C). For the neutralization it is possible to use ammonia and/or amines (especially alkylamines), amino alcohols and cyclic amines, such as di- and triethylamine, dimethylaminoethanolamine, diisopropanolamine, morpholine, or an N-alkylmorpholine. Highly volatile amines are preferred for the neutralization. After the reaction has concluded, the reaction product obtained in this way can be worked up and formulated in a known manner.

Preferably, after the end of the reaction, the reaction mixture is first diluted with water and the organic solvent is removed under reduced pressure. The solids content of the mixture can be adjusted with water. It is preferably adjusted to a solids content of from 35% to 65%. The pH of such a resulting dispersion is between 6.4 and 7.5.

The resulting polyurethane resin (P) of the invention is outstandingly suitable simultaneously as binder and as rheology control additive for coating compositions, especially as an additive for aqueous coating compositions, such as 1K (one-component) waterborne coating materials, 2K (two-component) waterborne coating materials, and physically drying waterborne coating materials. With very particular preference, the polyurethane resin of the invention is used as an additive for aqueous polyurethane coating compositions (1K, 2K, and physically drying). Preferably, the polyurethane resin is used as an additive for clearcoats and topcoats, especially for coating plastics.

The polyurethane resin (P) of the invention is used with very particular preference in aqueous two-component polyurethane coating compositions which comprise a component (I) and a component (II) and in which component (I) comprises (I-1) one or more polyurethane resins (P) of the invention, (I-2) one or more water-soluble or water-dispersible acrylate copolymers containing hydroxyl groups and acid groups which can be converted to the corresponding acid anion groups, and/or acrylated polyesters and/or acrylated polyurethanes, having an OH number of from 40 to 200 mg KOH/g and an acid number of from 5 to 150 mg KOH/g, and (I-3) if desired, one or more further polymers and component (II) comprises a polyisocyanate component as crosslinking agent, said components (I-1) to (I-3) and said crosslinking agent being used in amounts such that the ratio of equivalents of hydroxyl groups of components (I-1) to (I-3) to the isocyanate groups of the crosslinking agent is between 1:2 and 2:1, preferably between 1:1.2 and 1:1.5.

Aqueous two-component polyurethane coating compositions of this kind are described, for example, in German Patent Application P 196 11 646.5, unpublished at the priority date of the present specification.

As the acrylate copolymer (I-2) containing hydroxyl groups and acid groups, all acrylate copolymers having OH numbers of from 40 to 200 mg KOH/g, acid numbers of from 5 to 150 mg KOH/g and, preferably, having number-average molecular weights of from 1000 to 30,000, with particular preference from 1000 to 15,000, are suitable.

As component (I-2) it is preferred to use acrylate copolymers obtainable by polymerizing, in an organic solvent or a solvent mixture and in the presence of at least one polymerization initiator,

- a1) a (meth)acrylic ester which is different than but copolymerizable with (a2), (a3), (a4), (a5) and (a6) and is essentially free from acid groups, or a mixture of such monomers,
- a2) an ethylenically unsaturated monomer which is different than (a5) and copolymerizable with (a1), (a3), (a4), (a3) and (a6), carries at least one hydroxyl group per molecule and is essentially free from acid groups, or a mixture of such monomers,
- a3) an ethylenically unsaturated monomer which is copolymerizable with (a1), (a2), (a4), (a5) and (a6) and carries per molecule at least one acid group which can be converted to the corresponding acid anion group, or a mixture of such monomers, and
- a4) if desired, one or more vinyl esters of alphabranched monocarboxylic acids having 5 to 18 carbon atoms per molecule and/or
- a5) if desired, at least one reaction product of acrylic and/or methacrylic acid with the glycidyl ester of an alpha-branched monocarboxylic acid having 5 to 18 carbon atoms per molecule or, instead of the reaction product, an equivalent amount of acrylic and/or methacrylic acid which is then reacted during or after the polymerization reaction with the glycidyl ester of an alpha-branched monocarboxylic acid having 5 to 18 carbon atoms per molecule,
- a6) if desired, an ethylenically unsaturated monomer which is different than (a1), (a2), (a4) and (a5) and copolymerizable with (a1), (a2), (a3), (a4) and (a5) and is essentially free from acid groups, or a mixture of such monomers, the nature and amount of (a1), (a2), (a3), (a4), (a5) and (a6) being selected such that the polyacrylate resin has the desired OH number, acid number and the desired molecular weight.

In order to prepare the polyacrylate resins used in accordance with the invention it is possible as component (a1) to use any ester of (meth)acrylic acid which is copolymerizable with (a2), (a3), (a4), (a5) and (a6) and is essentially free from acid groups, or ethoxylated or propoxylated derivatives of such an ester, or a mixture of such monomers.

As component (a2) it is possible to use ethylenically unsaturated monomers which are different than (a5) and copolymerizable with (a1), (a3), (a4), (a5) and (a6), carry at least one hydroxyl group per molecule and are essentially free from acid groups, or a mixture of such monomers. Examples are hydroxyalkyl esters of acrylic acid, methacrylic acid or another alpha, beta-ethylenically unsaturated carboxylic acid. These esters can be derived from an alkylene glycol, which is esterified with the acid, or they can be obtained by reacting the acid with an alkylene oxide. As component (a2) it is preferred to use hydroxyalkyl esters of acrylic acid or methacrylic acid in which the hydroxyalkyl group contains up to 20 carbon atoms, reaction products of cyclic esters, such as epsilon-caprolactone, for example, with these hydroxyalkyl esters, or mixtures of these hydroxyalkyl esters and/or epsilon-caprolactone-modified hydroxyalkyl esters. Furthermore, it is also possible as component (a2) to use olefinically unsaturated polyols and/or trimethylolpropane monoallyl ether.

As component (a3) it is possible to use any ethylenically unsaturated monomer which carries at least one acid group, preferably a carboxyl group, per molecule and is copolymerizable with (a1), (a2), (a4), (a5) and (a6), or a mixture of such monomers. Particular preference is given to using as component (a3) acrylic acid and/or methacrylic acid. Furthermore, it is possible, for example, to use ethylenically unsaturated sulfonic or phosphonic acids, and/or their partial esters, as component (a3).

As component (a4), use is made of one or more vinyl esters of alpha-branched monocarboxylic acids having 5 to 18 carbon atoms in the molecule. Owing to their ready availability, particular preference is given to the use of vinyl esters of saturated aliphatic monocarboxylic acids which have 9 to 11 carbon atoms and are branched on the alpha carbon atom.

The reaction product of acrylic acid and/or methacrylic acid with the glycidyl ester of an alpha-branched monocarboxylic acid having 5 to 18 carbon atoms per molecule is used as component (a5). Glycidyl esters of highly branched monocarboxylic acids are available under the trade name "Cardura". The reaction of acrylic or methacrylic acid with the glycidyl ester of a carboxylic acid having a tertiary alpha carbon atom can take place before, during or after the polymerization reaction.

As component (a6) it is possible to use all ethylenically unsaturated monomers, or mixtures of such monomers, which are copolymerizable with (a1), (a2), (a3), (a4) and (a5), are different than (a1), (a2), (a3) and (a4) and are essentially free from acid groups. As component (a6) it is preferred to use vinylaromatic hydrocarbons, such as styrene, alpha-alkylstyrenes and vinyltoluene.

Polysiloxane macromonomers may also be used as component (a6), in combination with other monomers specified as being suitable for use as component (a6). Suitable polysiloxane macromonomers, for example, are those having a number-average molecular weight Mn of from 1000 to 40,000 daltons, preferably from 2000 to 10,000 daltons, and having on average from 0.5 to 2.5, preferably from 0.5 to 1.5, ethylenically unsaturated double bonds per molecule. Suitable examples are the polysiloxane macromonomers described in DE-A 38 07 571 on pages 5 to 7, in DE-A 37 06 095 in columns 3 to 7, in EP-B 358 153 on pages 3 to 6, and in U.S. Pat. No. 4,754,014 in columns 5 to 9.

The amounts of the polysiloxane macromonomer(s) (a6) used to modify the acrylate copolymers is less than 5% by weight, preferably from 0.05 to 2.5% by weight, with particular preference from 0.05 to 0.8% by weight, based in each case on the overall weight of the monomers used to prepare the copolymer.

Acrylate resins used with particular preference are obtained by polymerizing

- (a1) from 20 to 60% by weight, preferably from 30 to 50% by weight, of component (a1),
- (a2) from 10 to 40% by weight, preferably from 15 to 35% by weight, of component (a2),
- (a3) from 1 to 15% by weight, preferably from 2 to 8% by weight, of component (a3),
- (a4) from 0 to 25% by weight, preferably from 5 to 15% by weight, of component (a4),
- (a5) from 0 to 25% by weight, preferably from 5 to 15% by weight, of component (a5), and
- (a6) from 5 to 30% by weight, preferably from 10 to 20% by weight, of component (a6), the sum of the weight fractions of components (a1) to (a6) being in each case 100% by weight.

The polyacrylate resins (I-2) used in accordance with the invention are prepared in an organic solvent or solvent mixture and in the presence of at least one polymerization initiator.

In this context it is also possible first to prepare the polyacrylate resins in a solvent which is not dilutable in water and, if desired, to replace this solvent partially by water-dilutable solvent following the polymerization.

The initiators are used preferably in an amount of from 2 to 25% by weight, with particular preference from 4 to 10% by weight, based on the overall weight of the monomers. The polymerization is judiciously conducted at a temperature of from 80 to 160 degrees C, preferably from 110 to 160 degrees C.

The polyacrylate resin is preferably prepared by a two-stage process, since in this way the resulting aqueous coating compositions have better processability. It is therefore preferred to use polyacrylate resins obtainable by 1. polymerizing a mixture of (a1), (a2), (a4), (a5) and (a6) or a mixture of portions of components (a1), (a2), (a4), (a5), (a6) in an organic solvent,
2. after at least 60% by weight of the mixture consisting of (a1), (a2), (a4), (a5) and, if present, (a6) have been added, adding (a3) and any remainder of components (a1), (a2), (a4), (a5) and (a6) and continuing polymerization, and
3. after the end of polymerization, subjecting the resulting polyacrylate resin, if desired, to at least partial neutralization, i.e., converting the acid groups into the corresponding acid anion groups.

In addition, however, it is also possible to introduce components (a4) and/or (a5) together with at least a portion of the solvent, as an initial charge, and to meter in the remaining components. Furthermore, components (a4) and/or (a5) can also be included only in part in the initial charge, together with at least a portion of the solvent, and the remainder of these components can be added as described above. Preferably, for example, at least 20% by weight of a solvent and about 10% by weight of component (a4) and (a5) and, if desired, portions of components (a1) and (a6) are included in the initial charge.

Preference is also given to the preparation of polyacrylate resins by a two-stage process in which stage (I) lasts from 1 to 8 hours, preferably from 1.5 to 4 hours, and the addition of the mixture of (a3) and any remainder of components (a1), (a2), (a4), (a5) and (a6) is made over the course of from 20 to 120 minutes, preferably over the course of from 30 to 90 minutes. After the end of the addition of the mixture of (a3) and any remainder of components (a1), (a2), (a4), (a5) and (a6), polymerization is continued until all of the monomers employed have undergone essentially complete reaction.

The amount and rate of addition of the initiator are preferably chosen so as to give a polyacrylate resin having the desired number-average molecular weight. It is preferable to commence the initiator feed at a certain time, generally about 15 minutes, before the feed of the monomers. Preference is further given to a process in which the addition of the initiator is commenced at the same time as the addition of the monomers and is ended about half an hour after the addition of the monomers has been ended. The initiator is preferably added in a constant amount per unit time. After the end of the addition of initiator, the reaction mixture is held at polyermization temperature until (generally 1.5 hours) all of the monomers employed have undergone essentially complete reaction. "Essentially complete reaction" is intended to signify that preferably 100% by weight of the monomers employed have been reacted but that it is also possible for a small residual monomer content of not more than up to about 0.5% by weight, based on the weight of the reaction mixture, to remain unreacted.

Preferably, the monomers for preparing the polyacrylate resins are polymerized at not too high a polymerization solids content, preferably at a polymerization solids content of from 80 to 50% by weight, and subsequently the solvents are partly removed by distillation so that the resultant polyacrylate resin solutions have a solids content of preferably from 80 to 60% by weight.

Also suitable as component (I-2) are acrylated polyesters having an OH number of from 40 to 200 mg KOH/g, with particular preference from 60 to 160 mg KOH/g, and an acid number of from 5 to 150 mg KOH/g, preferably from 15 to 75 mg KOH/g and, with particular preference, from 20 to 50 mg KOH/g. Preferably, the acrylated polyesters have number-average molecular weights Mn of between 1000 and 50,000 daltons, more preferably between 1000 and 15,000 daltons, measured in each case against a polystyrene standard.

The acrylated polyesters used as component (I-2) are known. Suitable acrylated polyesters can be prepared with the aid of various processes known to the skilled worker: for example, by way of the incorporation of trimethylolpropane monoallyl ether or maleic anhydride or other reactive anhydrides which can be polymerized with styrene and/or (meth)acrylates, followed by acrylation (organic or aqueous).

Also suitable as component (I-2) are acrylated polyurethanes having an OH number of from 40 to 200 mg KOH/g, with particular preference from 60 to 160 mg KOH/g, and an acid number of from 5 to 150 mg KOH/g, preferably from 15 to 75 mg KOH/g and, with particular preference, from 20 to 50 mg KOH/g. Preferably, the acrylated polyurethanes have number-average molecular weights Mn of between 1000 and 50,000 daltons, more preferably between 1000 and 15,000 daltons, measured in each case against a polystyrene standard.

The acrylated polyurethanes used as component (I-2) are likewise known. Suitable acrylated polyurethanes are described, for example, in DE-A-41 22 265, page 2, line 15 to page 5, line 44; DE-A-40 10 176, page 2, line 41 to page 6, line 64; EP-A-308 115, page 2, line 29 to page 5, line 21; EP-A-510 572, page 3, line 21 to page 5, line 42; and U.S. Pat. No. 4,496,708, column 4, line 5 to column 12, line 46.

Compounds suitable as component (I-3) for preparing the coating compositions of the invention are, for example, all water-soluble or water-dispersible polyester resins containing hydroxyl groups and acid groups which can be converted to the corresponding acid anion groups, preferably those polyester resins having an OH number of from 30 to 250 mg KOH/g, with particular preference from 60 to 200 mg KOH/g, and an acid number of from 5 to 150 mg KOH/g, with particular preference from 15 to 75 mg KOH/g and, with very particular preference, from 20 to 50 mg KOH/g. These polyester resins preferably have number-average molecular weights Mn of between 500 and 30,000 daltons, with particular preference between 1000 and 10,000 daltons and, with very particular preference, between 1000 and 5000 daltons, measured in each case against a polystyrene standard. It is preferred to use branched polyesters.

Preference is given to the use of polyesters obtainable by reacting
p1) di- and/or polycarboxylic acids or their esterifiable derivatives, alone or together with monocarboxylic acids,
p2) diols
p3) polyols, alone or together with monools, and
p4) if desired, further modifying components.

Particular preference is given in this context to the use of polyesters which have been prepared without using monools and monocarboxylic acids. Likewise with particular preference, the polyesters are free from unsaturated fatty acids.

With regard to the compounds (p1) to (p3) suitable for preparing the polyesters, reference may be made to the description of the polymers (D). Compounds particularly suitable as component (p4) for preparing the polyesters are those having a group which is reactive toward the functional groups of the polyester. As modifying component (p4) it is possible, for example, to use diepoxide compounds, and also monoepoxide compounds if desired. Suitable components (p4) are described, for example, in DE-A-40 24 204 on page 4, lines 4 to 9.

Also suitable as component (p4) for preparing polyesters are compounds which, in addition to a group which is reactive toward the functional groups of the polyester, have a tertiary amino group, examples being monoisocyanates having at least one tertiary amino group or mercapto compounds having at least one tertiary amino group. For details reference is made to DE-A-40 24 204, page 4, lines 10 to 49.

Particular preference is given to the use of polyesters which have been prepared by a two-stage process in which first of all a hydroxyl-containing polyester having an OH number of from 100 to 400 mg KOH/g, preferably from 150 to 350 mg KOH/g, an acid number of less than 10 mg KOH/g and a number-average molecular weight Mn of from 500 to 2000 daltons is prepared and is then reacted in a second stage with carboxylic anhydrides to give the desired polyester. The amount of carboxylic anhydrides in this case is chosen such that the resulting polyester has the desired acid number. For this reaction, all of the commonly employed acid anhydrides are suitable.

In addition to this reaction of carboxylic anhydrides, the acid groups can also be introduced into the polyester by using dimethylolpropionic acid and the like.

Component (I) of the coating composition may comprise as a further constituent (I-B) all customary coatings pigments in proportions of from 0 to 60% by weight, based on component I. The pigments can consist of organic or inorganic compounds and can be effect pigments and/or color pigments.

As a further constituent (I-C), component (I) and, if appropriate, the binder as well can comprise at least one organic, fully or partly water-soluble solvent. Such solvents may also participate in the reaction with the crosslinking component (II) and thus act as reactive diluents.

The solvents (I-C) may further consist in full or in part of low molecular mass oligomeric compounds, which may be reactive or else nonreactive toward the crosslinking component (II). The solvents (I-C) are usually used in an amount of from 0 to 20% by weight, preferably of less than 15% by weight, based on the overall weight of component (I).

Component (I) normally includes as constituent (I-D) at least one neutralizing agent. A particularly preferred neutralizing agent used is dimethylethanolamine.

The amount of neutralizing agent used overall in the coating composition of the invention is chosen such that from 1 to 100 equivalents, preferably from 50 to 90 equivalents, of the acid groups of the binder (I-A) are neutralized.

Component (I) may, if desired, comprise as constituent (I-E) at least one further rheology control additive. Examples of rheology control additives are crosslinked polymeric microparticles, inorganic sheet silicates, and synthetic polymers having ionic and/or associative groups or else hydrophobically modified ethoxylated urethanes or polyacrylates. Component (I) preferably includes from 0 to 2% by weight of these further rheology control additives, based on the overall weight of component (I).

Component (I) may additionally comprise, if desired, at least one further customary coatings additive. Examples of such additives are defoamers, dispersing aids, emulsifiers, and leveling assistants.

Finally, component (I) also includes water.

The coating component (II) comprises as crosslinking agent at least one preferably nonblocked di- and/or polyisocyanate (F1) which is, if desired, dissolved or dispersed in one or more organic, possibly water-dilutable solvents.

The polyisocyanate component (F1) comprises any desired organic polyisocyanates having free isocyanate groups attached to aliphatic, cycloaliphatic, araliphatic and/or aromatic moieties. Preference is given to the use of polyisocyanates having from 2 to 5 isocyanate groups per molecule and viscosities of from 100 to 2000 mPas (at 23° C.). If desired, the polyisocyanates may also be admixed with small amounts of organic solvent, preferably from 1 to 25% by weight based on pure polyisocyanate, in order thus to improve the ease of incorporation of the isocyanate and, if desired, to reduce the viscosity of the polyisocyanate to a value within the abovementioned ranges. Solvents suitable as additives for the polyisocyanates are, for example, ethoxyethyl propionate, butyl acetate and the like.

Examples of suitable isocyanates are described, for example, in "Methoden der organischen Chemie", Houben-Weyl, Volume 14/2, 4th edition, Georg Thieme Verlag, Stuttgart 1963, page 61 to 70, and by W. Siefken, Liebigs Ann. Chem. 562, 75 to 136. Examples of those suitable are the isocyanates (a) mentioned in connection with the description of the polyurethane resins (P), and/or isocyanate-functional polyurethane prepolymers, which can be prepared by reacting polyols with an excess of polyisocyanates and which are preferably of low viscosity.

It is also possible to use polyisocyanates having isocyanurate groups and/or biuret groups and/or allophanate groups and/or urethane groups and/or urea groups and/or uretdione groups. Polyisocyanates having urethane groups, for example, are obtained by reacting some of the isocyanate groups with polyols, such as trimethylolpropane and glycerol, for example.

It is preferred to use aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate or dicyclohexylmethane 4,4'-diisocyanate or mixtures of these polyisocyanates. Very particular preference is given to the use of mixtures of polyisocyanates which are based on hexamethylene diisocyanate and contain uretdione and/or isocyanurate and/or allophanate groups, as are formed by catalytic oligomerization of hexamethylene diisocyanate using appropriate catalysts. The polyisocyanate component (F1) may also consist, furthermore, of any desired mixtures of the polyisocyanates exemplified.

In the coating compositions of the invention, the polyisocyanate component (F1) is advantageously used in an amount such that the ratio of the hydroxyl groups of the binder (A) to the isocyanate groups of the crosslinker (F1) is between 1:2 and 2:1, with particular preference between 1:1 and 1:1.5.

The two components (I) and (II) of the coating composition of the invention are prepared by the customary methods from the individual constituents with stirring. The preparation of the coating composition comprising these two components (I) and (II) takes place likewise by means of stirring or dispersing using the apparatuses that are commonly employed; for example, by means of dissolvers or the like or by means of likewise commonly employed two-component metering and mixing units or by means of the process for preparing aqueous 2K polyurethane coating materials that is described in DE-A-195 10 651, page 2, line 62 to page 4, line 5.

The aqueous coating materials prepared using the polyurethane resin (P) of the invention generally contain, in the application-ready state, from 5 to 14% by weight of the polyurethane resin (P), from 25 to 75, preferably from 35 to 70% by weight of water, from 0 to 50, preferably from 0 to 20% by weight of organic solvents, from 6 to 70 and preferably 15 to 60% by weight of binders (I-1) to (I-3), preferably from 0 to 25% by weight of pigments and/or fillers and from 0 to 10% by weight of other additives, such as, for example, catalysts, thickeners, leveling agents and so on, the percentages by weight being based on the overall formulation of the coating materials in the application-ready state (i.e., for example, at spray viscosity) and on the solids content of the binders, crosslinkers and polyurethane resin (P).

Aqueous coating materials of the invention can be used to coat primed or unprimed plastics such as, for example, ABS, AMMA, ASA, CA, CAB, EP, UF, CF, MF, MPF, PF, PAN, PA, PC, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations in accordance with DIN 7728P1). The plastics to be coated can of course also be polymer blends, modified plastics or fiber-reinforced plastics. The coating compositions of the invention are preferably used to coat PPE/PA blends, polycarbonate blends (e.g., PC/ASA, PC/PBT) and polypropylene blends. The coating compositions of the invention are employed in particular for the plastics that are commonly used in vehicle construction, especially motor vehicle construction.

In the case of unfunctionalized and/or nonpolar substrate surfaces, these surfaces must be subjected to a pretreatment, such as plasma or flame treatment, prior to coating.

Suitable primers in this context are all customary primers, both conventional and aqueous. It is of course also possible to use radiation-curable, and radiation-curable aqueous, primers.

The coating compositions of the invention are used to produce a single-coat or multicoat coating system, and preferably as clearcoats or as topcoats, in particular as the clearcoat of a multicoat paint system produced by the wet-on-wet technique. The plastics or other substrates can of course also be coated directly with the clearcoat or with the topcoat.

Finally, the coating compositions can also be applied to other substrates, such as, for example, metal, wood or paper or mineral substrates. They can further be used for coatings of cargo containers and packaging or the like. Application is made with the aid of customary methods, examples being spraying, knife coating, dipping, brushing or the coil-coating process.

The coating compositions of the invention are commonly cured at temperatures below 120 degrees C, preferably at temperatures of not more than 100 degrees C. and, with very particular preference, of not more than 80° C. In specific embodiments of the coating compositions of the invention it is also possible to employ higher curing temperatures.

The coating compositions of the invention are preferably used to produce topcoats. The coating compositions of the invention can be used both in the OEM finishing and in the refinishing of automobile bodies. Preferably, however, they are used in the refinishing sector, and with very particular preference in the coating of plastics parts.

Finally, the present invention further provides for the use of the above-described polyurethane resin (P) as a rheology control additive for coating compositions, and provides for the use of the resulting coating compositions.

In the text below, the invention is elucidated in more detail with reference to working examples. In these examples, all parts are parts by weight unless expressly indicated otherwise.

1. Preparation of a dispersion of a polyurethane resin (P1)
    1.1. Preparation of a hydroxyl-containing polyester (D1)
    For 1 kg of polyester, 128.9 g of neopentyl glycol, 318.9 g of neopentyl glycol hydroxypivalate, 166.0 g of trimethylolpropane, 205.5 g of isophthalic acid, 40 g of xylene and 254.3 g of hexahydrophthalic anhydride were weighed out into a steel apparatus suitable for polycondensation reactions, the mixture was heated continuously and the water of condensation was removed continuously. At an acid number of the product of 3 mg KOH/g, the reaction was ended and the mixture was cooled to 100° C. and diluted to 80% solids with methyl ethyl ketone (MEK) (viscosity, 50% strength in MEK, 0.2 dPa.s). The condensation product obtained in this way had an OH number of 202 mg KOH/g and an acid number of 3.5 mg KOH/g, based in each case on solid resin.

1.2. Preparation of a polyurethane resin (P)
    444.4 g of isophorone diisocyanate, 133.9 g of dimethylolpropionic acid and 568.0 g of methyl ethyl ketone were weighed out into a steel reactor suitable for polyaddition reactions, and were heated to 80° C. At a constant isocyanate content of 7.4%, based on the mixture used, the mixture was cooled to 50° C., 294.7 g of stearyl isocyanate were added, and this mixture was heated again to 82° C. Heating was continued at this temperature until a constant NCO value was obtained. The mixture was then cooled to 50° C. and, subsequently, 2110 g of the above-described polyester solution (D1) were added. The mixture was subsequently heated to 80° C. At an isocyanate content <0.1% and a viscosity of 3.6 dPas (10:3 in N-methylpyrrolidone) the mixture was neutralized with 71.2 g of N,N-dimethylethanolamine. It was then diluted with water and the organic solvent was removed under reduced pressure. Finally, a solids content of 49.2% was established using deionized water. The pH of a dispersion was 6.8. The dispersion was free from gel specks, homogeneous, and stable on storage at 50° C. for at least 4 weeks. The DMEA content was 13%, the solvent content 0%. The polyurethane resin had an OH number of 99 mg KOH/g, an acid number of 23.4 mg KOH/g and a number-average molecular weight of 1934 (weight-average molecular weight 5566), measured against a polystyrene standard and based on solid resin.

2. Preparation of a solution of the polyurethane resin (P1)
    This preparation was initially carried out as for the preparation of the polyurethane resin dispersion, but with the difference that the MEK was replaced by isopropoxypropanol by means of vacuum distillation. A solution solids content of 64.9% was established using isopropoxypropanol. The product has a pH of 7.4 and a viscosity at 23° C. of 3.9 dPas (10:3 in N-methylpyrrolidone).

3. Preparation of a dispersion of a polyurethane resin (PV1) not modified with monoisocyanate
    488.4 g of meta-tetramethylxylylene diisocyanate, 134.1 g of dimethylolpropionic acid and 568.0 g of methyl ethyl ketone were weighed out into a steel reactor suitable for polyaddition reactions and were heated to 80° C. At a constant isocyanate content of 7.4%, based on the mixture used, the mixture was cooled to 50° C. and 2110 g of the above-described polyester solution (D1) were added. The mixture was subsequently heated to 80°C. At an isocyanate content <0.1% and a viscosity of 3.6 dPas (10:3 in N-methylpyrrolidone), the mixture was neutralized with 71.2 g of N,N-dimethylethanolamine. It was then diluted with water and the organic solvent was removed under reduced pressure. Finally, a solids content of 43% was established using deionized water. The pH of the dispersion was 6.8. The dispersion was free from gel specks, homogeneous and stable on storage at 50° C. for at least 8 weeks. The DMEA content was 1.42%, the solvent content 0.5%. The polyurethane resin had an OH number of 98 mg KOH/g, an acid number of 26 mg KOH/g and a number-average molecular weight of 1713, measured against a polystyrene standard and based on solid resin.

4. Preparation of a dispersion of an acrylate resin

A 4 l steel vessel equipped with two monomer feed ports, an initiator feed port, stirrer and reflux condenser is charged with 470 parts by weight of n-butanol as solvent component (B2) (water solubility WS: 9.0, evaporation number EVN: 33, boiling point BP: 118 degrees C.) and heated to 110 degrees C. Then a solution of 36 parts by weight of tert-butyl peroxyethylhexanoate in 92.4 parts by weight of n-butanol (B2) is added at a rate such that the addition is over after 5.5 hours. Commencement of the addition of the tert-butyl peroxyethylhexanoate solution is accompanied by commencement of the addition of the mixture of (a1) to (a6):

(a1): 240 parts by weight of n-butyl methacrylate, 209 parts by weight of methyl methacrylate, 120 parts by weight of lauryl methacrylate (Methacryl ester 13 from Rohm GmbH), (a2): 270 parts by weight of hydroxyethyl methacrylate, and (a6): 180 parts by weight of styrene.

The mixture of (a1), (a2) and (a6) is added at a rate such that the addition is over after 5 hours.

3.5 hours after beginning the first monomer feed, a second monomer feed is commenced, which is ended conjointly with the first monomer feed and consists of a mixture of the monomer components (a2) and (a5):

(a2): 120 parts by weight of hydroxyethyl methacrylate, and (a5): 61 parts by weight of acrylic acid.

After the end of the addition of the tert-butyl peroxyethylhexanoate solution, the reaction mixture is held at 120 degrees C for 2 h more. The resin solution is then cooled to 80 degrees C and neutralized to a degree of neutralization of 85% over the course of about 30 minutes with 63 parts by weight of dimethylethanolamine in 1379 parts by weight of water. The solvent (B) n-butanol is subsequently removed by azeotropic distillation until not more than 1% by weight of (B), based on the dispersion, can be detected by gas chromatography.

After the end of the distillation, the dispersion is adjusted to the following final parameters by adding deionized water:

Acid number of total solids: 37.2 mg KOH/g,

Solids content (1 hour, 130 degrees C): 38.3%, pH: 7.40.

Dimethylethanolamine content: 2.11%

Solvent content: 0.52%

The acrylate resin prepared in this way had a number-average molecular weight of 7772 daltons and a weight-average molecular weight of 26,651, measured against a polystyrene standard, an OH number of about 140 mg KOH/g and an acid number of 37.2 mg KOH/g, based in each case on solid resin.

5. Preparation of the coating compositions of Examples 1 and 2 and of Comparative Example 1

From the components indicated in Table 1 the coating compositions are prepared by first premixing the above-described polyurethane dispersion (P1) and the above-described acrylate dispersion by means of stirring for 10 minutes with a laboratory stirrer (500 revolutions/min). In addition, an additives solution is prepared from the additives indicated in Table 1 by stirring with a laboratory stirrer. This additives solution is incorporated into the premix of the polyurethane and acrylate dispersions by means of stirring for 10 minutes with a laboratory stirrer (500 revolutions/min). Then deionized water is incorporated by stirring for 10 minutes with a laboratory stirrer (500 revolutions/min). The aqueous stock coating material obtained in this way has a solids content of 33%.

To prepare the clearcoat, the solution of the isocyanate is incorporated into the aqueous stock coating material by stirring for 5 minutes with a laboratory stirrer (500 revolutions/min). Finally, the clearcoat is adjusted with deionized water to the viscosity indicated in Table 1.

6. Application of the coating compositions and test results of the resulting coatings The coating compositions prepared in this way are applied pneumatically to PP panels (dry film coat thickness 30–35 micrometers). The panels coated in this way are flashed off at room temperature for 10 minutes and then baked at 90° C. for 45 minutes. They are then aged for 8 days at 22° C. and 50% relative atmospheric humidity. Subsequently, the free clearcoat films are subjected to various tests. The test results of the coatings are summarized in Table 2.

In addition, the coating compositions prepared in this way are applied pneumatically (dry film coat thickness 30–35 micrometers) to steel panels which were coated first with a commercial polyurethane-based surfacer (Füller FC 60-7415 from BASF Lacke+Farben AG, Münster) and subsequently with a commercial polyurethane-based aqueous basecoat (FV 95-9416 from BASF Lacke+Farben AG, Münster). The panels coated in this way are flashed off at room temperature for 10 minutes and then baked at 90° C. for 45 minutes. They are then aged for 8 days at 22° C. and 50% relative atmospheric humidity. The free clearcoat films are subsequently subjected to various tests. The test results of the coatings are summarized in Table 2.

Summary of the test results

Example 1 shows that, by using a monoisocyanate-modified polyurethane resin as a further binder, clearcoats having good appearance (haze values) and good wetting on the aqueous basecoat (contact angle) are obtained and that the resulting coatings also feature good gloss. Furthermore, the binder components (I) of the example exhibit good stability on storage for at least six months at 23° C. or for at least 8 weeks at 40° C.

TABLE 1

Composition of the coating compositions of Example 1 and of Comparative Example 1

| | Ex. 1 | Comp. Ex 1 |
|---|---|---|
| PU dispersion (P1)[1] | 14.160 | — |
| PU solution (P1)[2] | — | — |
| PU dispersion (VP1)[3] | — | 18.19 |

TABLE 1-continued

Composition of the coating compositions of
Example 1 and of Comparative Example 1

|  | Ex. 1 | Comp. Ex 1 |
|---|---|---|
| PAC dispersion[4] | 64.370 | 64.370 |
| Isopropoxypropanol[5] | 1.634 | 1.440 |
| Butoxypropanol[6] | 3.267 | 2.880 |
| Butylglycol acetate[7] | 4.899 | 4.310 |
| Emulsifier[8] | 0.652 | 0.652 |
| Polysil.-polyether[9] | 0.938 | 0.938 |
| Dimethylpolysiloxane[10] | 0.078 | 0.078 |
| Heptamethyltrisil.[11] | 0.78 | 0.078 |
| Benzotriazole[12] | 0.155 | 0.155 |
| HALS[13] | 0.271 | 0.271 |
| Thickener[14] | — | 1.955 |
| Water[15] | 9.498 | 4.683 |
| Total | 100.00 | 100.00 |
| SC (B) total[16] | 33.32% | 33.52% |
| HDI[17] | 20.80 | 20.17 |
| EEP[18] | 5.20 | 5.04 |
| Added water[19] | 20.50 | 22.00 |
| pH | 7.3 | 7.2 |

Key to Table 1:
[1] polyurethane dispersion (P1) described under 1.
[2] polyurethane solution (P1) described under 2.
[3] polyurethane dispersion (VP1) described under 3.
[4] polyacrylate dispersion described under 4.
[5] 1(2)-isopropoxy-2(1)-propanol
[6] 1(2)-butoxy-2(1)-propanol
[7] 2-butoxyethyl acetate
[8] commercial emulsifier based on octylphenol polyglycol ether
[9] commercial polyether-modified dimethyloligosiloxane
[10] commercial polyether-modified dimethylpolysiloxane
[11] commercial wetting agent based on a heptamethyltrisiloxane
[12] commercial light stabilizer based on benzotriazole
[13] commercial light stabilizer based on a sterically hindered amine (HALS)
[14] 10% strength aqueous solution of a commercial thickener based on dialkyl polyglycol ether
[15] water added to adjust viscosity of stock coating material
[16] solids content of all binders
[17] commercial polyisocyanate (80% strength in ethyl ethoxypropionate) based on hexamethylene diisocyanate, having an NCO content of 20%
[18] ethoxyethyl propionate
[19] water added to adjust the viscosity

TABLE 2

Test results

|  |  | Ex. 1 | Comp. Ex. 1 |
|---|---|---|---|
| Viscosity[1] | (mPa · s) | 152 | 355 |
| Contact angle[2] |  | 52.9 | 58.6 |
| Appearance | 20° gloss[3] | 87 | 83 |
|  | 20° haze[4] | 12 | 21 |
|  | Stock glass[5] | satisfactory | satisfactory |
|  | A1 glass[6] | satisfactory | satisfactory |

Key to Table 2:
[1] viscosity of the clearcoat at 23° C. in mPa · s after adjustment to an efflux time of 30 s from the DIN 4 cup, measured at a shear rate of 10 s$^{-1}$
[2] measured with the aid of a commercial contact angle measuring instrument from Krüss on the steel panels described above under 7, the panels being coated with surfacer, aqueous basecoat and the clearcoats
[3] gloss at 20°, measured using the Haze-Gloss instrument of Byk-Gardner on the steel panels described above under 7
[4] haze at 20°, measured using the Haze-Gloss instrument of Byk-Gardner on the steel panels described above under 7
[5] appearance of a drawdown on glass of the stock coating material, assessed visually
[6] appearance of a drawdown on glass of the component A1, assessed visually

What is claimed is:

1. A polyurethane resin (P) obtained by
   (A) in a first reaction stage reacting
      (a) one or more compounds selected from the group consisting of di-isocyanates, polyisocyanates, and mixtures thereof and
      (b) one or more compounds having at least one group which ensures dispersibility in water and more than one group which is reactive toward isocyanate groups,
   to give an intermediate (A) having free isocyanate groups and having urethane groups,
   (B) in a second reaction stage adding
      (d) one or more monoisocyanates
   to the intermediate (A) to obtain a mixture (B), and
   (C) subsequently reacting in a third reaction stage the resulting mixture (B) with one or more hydroxyl-containing polymers
   (D) to give the polyurethane resin (P), using less than 20% by weight, based on the weight of the polyurethane resin, of polyalkylene oxide diols and/or polyalkylene oxide polyols to prepare the polyurethane resin.

2. A polyurethane resin as claimed in claim 1 obtained by using in reaction stage (C) hydroxyl-containing polymers (D) having an OH number of from 100 to 1800 mg KOH/g.

3. A polyurethane resin as claimed in claim 1 obtained by using in reaction stage (C) as hydroxyl-containing polymers (D) hydroxyl-containing polymers selected from the group consisting of polyesters, alkyd resins, polyethers, polyacrylate resins, polyurea resins, polyurethane resins, polycarbonate resins and mixtures thereof.

4. A polyurethane resin as claimed in claim 1, obtained by using in reaction stage (C) as hydroxyl-containing polymers (D) polycondensation products formed from
   (k1) from 10 to 45 mol % of at least one diol,
   (k2) from 5 to 50 mol % of at least one polyol having at least 3 OH groups, and
   (k3) from 35 to 47 mol % of at least one dicarboxylic acid
the sum of the molar % of components (k1) to (k3) being in each case 100 mol % and wherein the condensation product is obtained by subjecting components (k1) to (k3) to a polycondensation reaction until the reaction product (D) has an acid number of from 1 to 10 mg KOH/g.

5. A polyurethane resin as claimed in claim 4, further comprising
   (k4) from 0 to 20 mol % of at least one monool.

6. A polyurethane resin as claimed in claim 1, wherein component (a) comprises isocyanate compounds selected from the group consisting of aliphatic and cycloaliphatic di-isocyanates and aliphatic and cycloaliphatic polyisocyanates, and mixtures thereof.

7. A polyurethane resin as claimed in claim 1, wherein said polyurethane resin (P) has an acid number of from 20 to 40 mg KOH/g.

8. A polyurethane resin as claimed in claim 1 or 7 obtained by using in reaction stage (C) hydroxyl-containing polymers (D) having an OH number having a number-average molecular weight of from 500 to 3000 and a degree of branching of from 2 to 4.

9. A polyurethane resin as claimed in claim 1 or 7, having a number-average molecular weight of from 1000 to 10,000.

10. A polyurethane resin according to claim 1, further comprising wherein the polyurethane is obtained by reacting in stage (A) one or more compounds (c) having at least 2 and not more than 3 OH groups.

11. A polyurethane resin as claimed in claim 1 or 10, wherein the proportions of the components (a), (b) and (c)

in the first reaction stage (A) are chosen such that the ratio of equivalents of NCO groups of compound (a) to the OH groups of compounds (b) and (c) is between 4.0:1.0 and >1.0:1.0.

12. A polyurethane resin as claimed in claim 1, wherein component (a) comprises isocyanate compounds selected from the group consisting of isocyanates based on hexamethylene diisocyanate, isophorone diisocyanate, isocyanatopropylcyclo-hexyl isocyanate 4,4'-dicyclohexylmethane-diyl diisocyanate and mixtures thereof.

13. The polyurethane resin of claim 1 wherein component (d) is selected from the group consisting of aliphatic monoisocyanates, cycloaliphatic monoisocyanates and mixtures thereof.

14. The polyurethane resin of claim 1 wherein component d) comprises stearyl isocyanate.

15. A polyurethane resin as claimed in claim 1 wherein the proportions of components (A) and (d) in the second reaction stage (B) are chosen such that the ratio of isocyanate groups of the monoisocyanate (d) to the urethane groups of component (A) is between 1:1 and 0.5:1.

16. A polyurethane resin as claimed in claim 15, wherein in the third reaction stage (C) the proportions of components (B) and (D) are chosen such that the polyurethane resin (P) essentially no longer contains any free isocyanate groups.

17. A process for preparing a polyurethane resin as claimed in claim 1, which comprises in a first reaction stage (A) reacting (a) one or more compounds selected from the group consisting of diisocyanates, polyisocyanates, and mixtures thereof, and (b) one or more compounds (b) which have at least one group which ensures dispersibility in water and more than one group which is reactive toward isocyanate groups, in a second reaction stage (B) adding (d) one or more monoisocyanates to the intermediate (A) obtained in stage (A), and subsequently reacting the resulting mixture (B) with one or more hydroxyl-containing polymers (D) to give the polyurethane resin (P).

18. A process as claimed in claim 17 further comprising in a first reaction stage (A) reacting with (a) and (b)

(c) one or more compounds having at least 2 and not more than 3 OH groups to give an intermediate (A) having free isocyanate groups and having urethane groups.

19. An aqueous coating composition, which comprises a polyurethane resin (P) as claimed in claim 1.

20. An aqueous coating composition as claimed in claim 19, which contains from 5 to 14% by weight of the polyurethane resin (P), based on the overall weight of the coating composition and based on the solids content of the polyurethane resin.

21. A coating composition as claimed in claim 19 or 20, which is a two-component polyurethane coating composition and comprises a component (I) and a component (II),
said component (I) comprising
(I-1) one or more of the polyurethane resins (P),
(I-2) one or more polymers selected from the group consisting of water-soluble or water-dispersible acrylate copolymers containing hydroxyl groups and acid groups which can be converted to the corresponding acid anion groups, acrylated polyesters, acrylated polyurethanes, having an OH number of from 40 to 200 mg KOH/g and an acid number of from 5 to 150 mg KOH/g, and
component (II) comprises a polyisocyanate component as crosslinking agent, said components (I-1) to (I-2) and said crosslinking agent being used in amounts such that the ratio of equivalents of hydroxyl groups of components (I-1) to (I-2) to the isocyanate groups of the crosslinking agent is between 1:2 and 2:1.

22. A coating composition as claimed in claim 21 further comprising one or more additional polymers (I-3), said components (I-1) to (I-3) and said crosslinking agent being used in amounts such that the ratio of equivalents of hydroxyl groups of components (I-1) to (I-3) to the isocyanate groups of the crosslinking agent is between 1:2 and 2:1.

23. A coating composition, as claimed in claim 19 comprising an aqueous two-component polyurethane coating composition, for controlling the rheology.

24. A coating composition as claimed in claim 19 comprising a topcoat or clearcoat for coating plastics.

25. A coating composition as claimed in claim 19 wherein component (b) is selected from the group consisting of di-hydroxy carboxylic acids, polyhydroxy-carboxylic acids and mixtures thereof.

26. A coating composition, as claimed in claim 19 comprising an aqueous two-component polyurethane coating composition, for controlling optical properties.

* * * * *